United States Patent [19]

Browning et al.

[11] Patent Number: 5,558,477

[45] Date of Patent: Sep. 24, 1996

[54] VIBRATION DAMPING SYSTEM USING ACTIVE NEGATIVE CAPACITANCE SHUNT CIRCUIT WITH PIEZOELECTRIC REACTION MASS ACTUATOR

[75] Inventors: Douglas R. Browning, Randolph; Woodson D. Wynn, Basking Ridge, both of N.J.

[73] Assignee: Lucent Technologies Inc., Murray Hill, N.J.

[21] Appl. No.: 348,527

[22] Filed: Dec. 2, 1994

[51] Int. Cl.[6] .............................. B23B 47/00; G01B 7/16
[52] U.S. Cl. ...................... 408/143; 73/11.04; 73/579; 73/769; 188/380; 310/316; 310/326; 409/141
[58] Field of Search .......................... 408/143; 409/141; 188/378–380; 310/316, 319, 326; 73/1 DV, 11.04, 579, 769

[56] References Cited

U.S. PATENT DOCUMENTS 4,158,787  6/1979  Forward ................................ 310/326
5,170,103  12/1992  Rouch et al. ......................... 408/143
5,347,870  9/1994  Dosch et al. ............................ 73/769
5,460,182  10/1995  Goodman et al. ...................... 128/664

Primary Examiner—Steven C. Bishop

[57] ABSTRACT

Boring bar vibration damping is improved by a novel use of the electromechanical properties of the piezoelectric actuator material. A negative capacitance shunt circuit is provided in which a voltage-controlled voltage-source continuously simulates a negative capacitance that is substantially equal in magnitude but opposite in phase to the capacitance of the piezoelectric material. The negative capacitance is shunted across the piezoelectric device, effectively compensating for the capacitance of the device across a broad frequency band. The voltages generated in the piezoelectric element in response to mechanical deformation induced by broadband vibrations of the structure during damping operations, may then be completely resistively dissipated, thereby enhancing the mechanical damping.

8 Claims, 2 Drawing Sheets

5,558,477

VIBRATION DAMPING SYSTEM USING ACTIVE NEGATIVE CAPACITANCE SHUNT CIRCUIT WITH PIEZOELECTRIC REACTION MASS ACTUATOR

FIELD OF THE INVENTION

This invention relates to mechanical vibration damping devices; and more specifically to improved use of piezoelectric actuators employed in such devices.

BACKGROUND OF THE INVENTION

Piezoelectric material is advantageously employed as the actuator in certain active mechanical vibration control apparatus because of its ability to generate substantial countervailing forces with relatively little mass. Additionally, using a piezoelectric element as the actuator makes electronically controlled damping of the overall system feasible and relatively simple when compared to alternative active control methods.

The typical electronic control arrangement includes sensors for detecting the frequency and amplitude of undesired mechanical vibrations occurring on a surface or in an element; and control circuitry responsive to the sensed information for driving the power amplifier of the piezoelectric device. Additionally, the prior art suggests use of a shunt network disposed across the piezoelectric device electrodes. The shunt circuit can in theory substantially cancel the capacitance of the piezoelectric device, with the result that the mechanical damping provided by the device may be increased.

If the mechanical damping required is limited to relatively narrow frequency bands, passive control circuits can generate the requisite narrowband capacitive cancellation using for example L-C resonance circuits. However, realizing a practical active controller circuit in conjunction with capacitance cancellation for broadband vibration damping is more difficult, due to the complexity of the time-spatial distributed nature of the total piezoelectric device-mechanical system. The damping performance of systems suggested to date has been sub-optimal where the vibrations are broadband.

A prime example of the unrealized potential for active damping circuits augmented by a negative capacitance shunt is the boring bar machine tool. When machining stiff or thick-walled workpieces, chatter tends to occur at the bar's first resonant frequency. Embedded piezoelectric reaction mass actuators have been proposed, but none have achieved the needed degree of broadband damping which would allow for precise, uniform cutting.

SUMMARY OF THE INVENTION

The broadband capacitive properties of the piezoelectric material are removed or canceled in accordance with the present invention, by a novel use of the electromechanical properties of the material. A negative capacitance shunt circuit is provided in which a voltage-controlled voltage-source continuously simulates a negative capacitance of equivalent magnitude which is shunted across the piezoelectric device, effectively compensating for the capacitance of the device across a broad frequency band. The total impedance of the combined shunt circuit and piezoelectric device is then much larger than that of the piezoelectric device alone. As a result, the voltages generated in the piezoelectric element in response to mechanical deformation induced by broadband vibrations of the structure during damping operations, may be completely resistively dissipated.

Advantageously, the voltage-controlled voltage source has both high voltage and medium current capabilities. In one embodiment, the shunt circuit is a simple feedback bridge arranged to have slightly less positive feedback through a selected circuit node comprising a capacitive divider, than it has negative feedback through a designated resistive branch circuit. This arrangement continuously simulates a negative capacitance with a value that nearly cancels the piezoelectric capacitance regardless of the distribution of the resonant frequencies of the mechanical system.

DESCRIPTION OF THE DRAWING

FIG. 3 is a mechanical/electrical diagram illustrating use of the negative capacitance shunt; and.

DETAILED DESCRIPTION OF AN ILLUSTRATIVE EMBODIMENT

Figure 1:
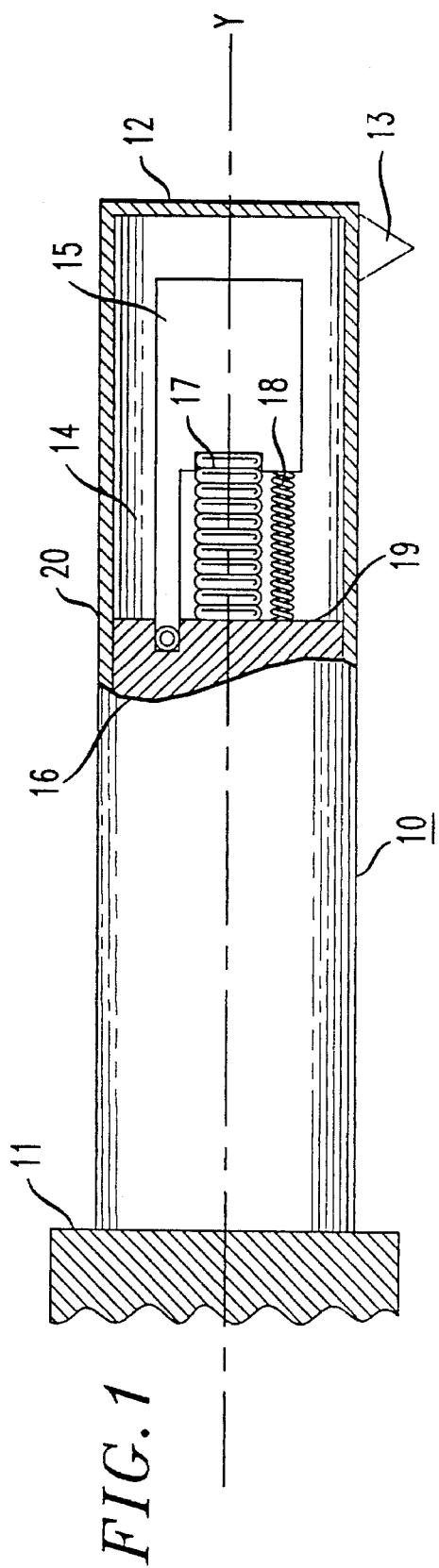
FIG. 1 is a schematic drawing of a boring bar with a piezoelectric driver for an internal actuator mass.

In FIG. 1, a tool or other element subject to vibration, which in the illustration is a boring bar 10, is mounted in a fixed holder 11. The tool head 12 mounts a metal cutting tool bit 13. An interior chamber 14 formed within the exterior walls 20 at the tool head 12 contains an actuator mass 15. Mass 15 is mounted on a hinge 16 fixed to floor 19 of chamber 14. A piezoelectric stack 17 is positioned between one surface of mass 15 and floor 19, such that energizing of the stack will cause the mass to pivot about hinge 16. Advantageously, a pre-load spring 18 is also at fixed between mass 15 and floor 19. Arrangements such as the preceding are known in the art, as exemplified for example, in U.S. Pat. No. 5,170,103 issued Dec. 8, 1992.

Figure 2:
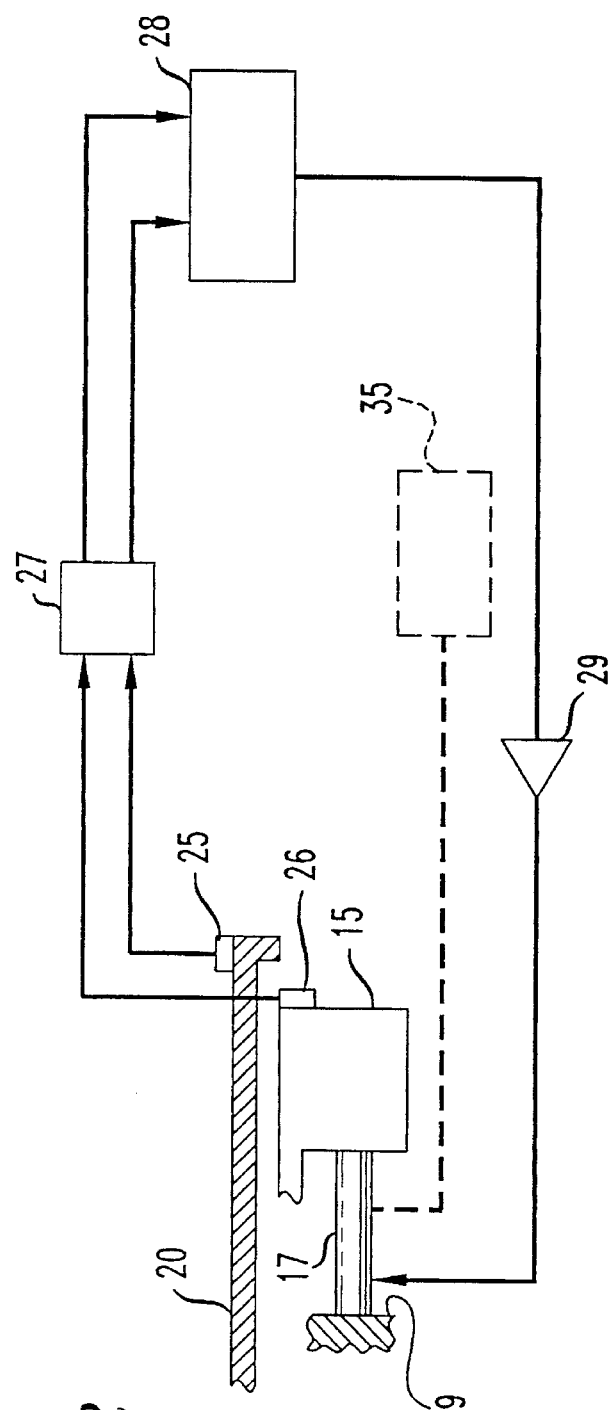
FIG. 2 is a schematic drawing of an actuator control circuit.

In FIG. 2, a generalized prior art form of active control circuit for driving piezoelectric stack 17 is shown in solid line. It includes accelerometer 25 which senses acceleration of the boring bar 10 as it experiences mechanical chatter during a cutting operation; and actuator mass accelerometer 26 which senses acceleration of the mass 15 caused by the drive circuit as well as by external mechanical forces. Signals from sensors 25, 26 are converted in integrator 27 to respective indicia of displacement of the boring bar 10 in the vicinity of bit 13, and of the actuator mass 15. These signals are received by computer 28, which uses them to generate specific control signals for modulating a power amplifier 29. The output of amplifier 29 applies a control voltage to piezoelectric stack 17, which is varied to continuously reduce the displacement of the tool bit 13, and thus reduce the chatter.

In accordance with the invention, a negative capacitance shunt circuit 35 is shown in dashed lines connected to stack 17. Although it is shown as separate from the active control circuit in FIG. 2, it should be understood that shunt circuit 3 S could be designed to be part of, or to augment, the active control circuit. Alternatively, it is envisioned that the shunt circuit 35 may be used in lieu of a conventional active control circuit in some circumstances. The details of an illustrative embodiment of shunt circuit 35 are explained hereinafter.

Figure 3:
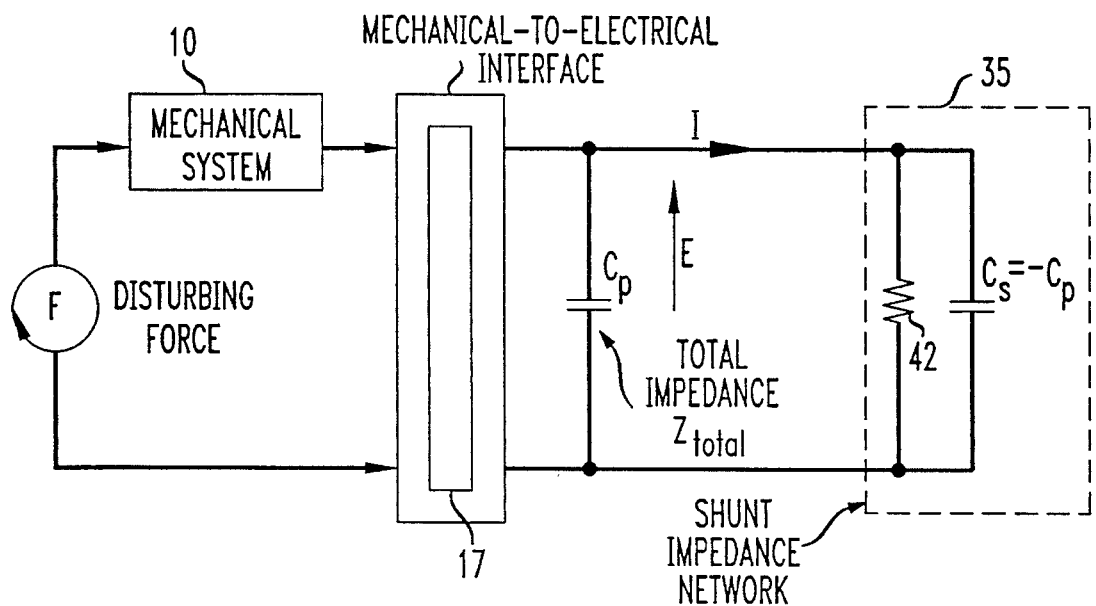

Because of the mechanical motion experienced by piezoelectric stack 17, a mechanical-to-electrical coupling exists, causing the device 17 to generate voltage and current waveforms. It has been realized that these waveforms can be advantageously exploited to produce a desirable mechanical damping effect. The chart of FIG. 3 shows the disturbing force F caused by the cutting of metal, which is transmitted to an overall mechanical system consisting in this illustration of the boring bar 10 and its components seen in FIG. 1. The mechanical-to-electrical coupling occurring in piezoelectric stack 17 generates a voltage across the piezoelectric electrodes as well as a current through the piezoelectric material. One strategy for taking advantage of the effects of this motion-induced voltage and current is to use a negative capacitance shunt.

Analysis further demonstrates that the impedance denoted $Z_{total}$ in FIG. 3 is the total electrical impedance of the piezoelectric stack 17 in parallel with the shunt circuit 35, and includes a capacitive component $C_p$. Shunt circuit 35 connected in parallel with stack 17 contains circuitry which ideally for all resonant frequencies has a driving-point impedance given by the following:

$$E(jw)/I(jw) = -1/jC_p w \quad (1)$$

where E is a voltage across $C_p$ and I is a current entering shunt circuit 35, as depicted in FIG. 3. Then, the shunt electrically looks like a capacitance of $-C_p$.

The objective which prior art control circuits has not achieved, is to generate a shunt impedance $Z_{shunt}$ which makes $Z_{total}$ effectively an open circuit at any frequency, whereby the shunt capacitance is continually made equal in magnitude to the stack capacitance, but opposite in phase.

Figure 4:
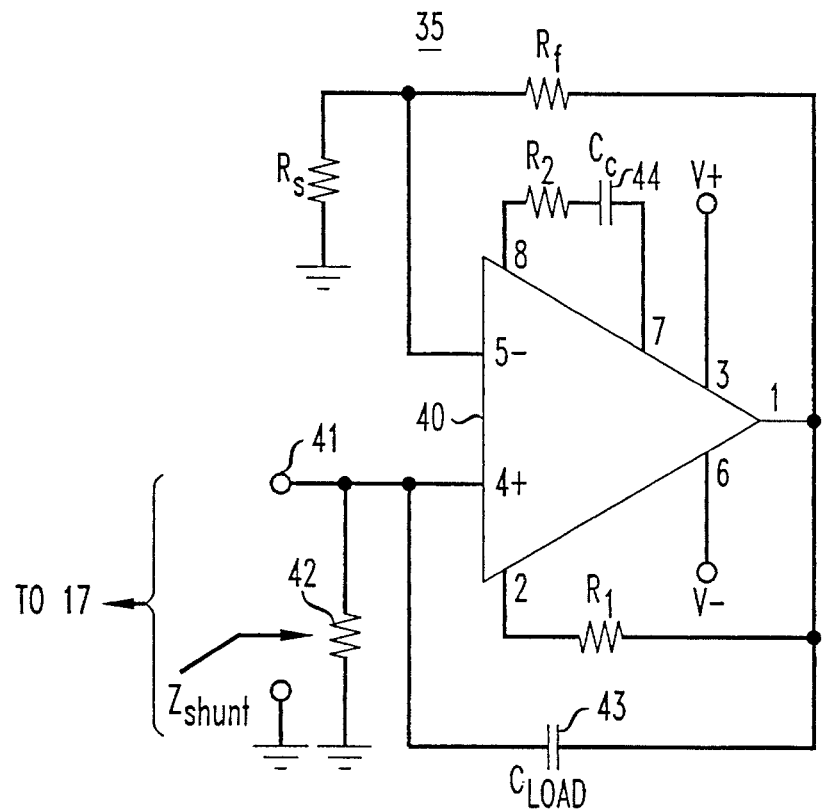
FIG. 4 is a circuit diagram of a novel active negative capacitance shunt circuit.

FIG. 4 shows an advantageous configuration for an active negative capacitance shunt circuit 35 in accordance with the present invention. The circuit is a positive feedback arrangement using a voltage-controlled voltage source to generate the desired negative capacitance. Circuit 35 contains an operational power amplifier 40 which may be an Apex Microtech item PA-85 more fully described in *Data Book Vol. 6* of the APEX Microtechnology Corp. of 5980 N. Shannon Drive, Tucson, Ariz. The numbered ports on the commercially available item are as shown in FIG. 4. Power amplifier 40 has the requisite high voltage and medium current capabilities found to be necessary for compatibility with the electrical properties of the particular piezoelectric stack material. The PZT piezoelectric material used in the present illustration has a peak-to-peak voltage limit of 120 volts, a capacitance $C_p$ of 20 microfarads and a frequency range of DC to 250 Hz. In this case, the maximum drive current is about 1 ampere. Specific requirements of active circuits using the invention will depend on the type of piezoelectric material used and bandwidth of control.

Amplifier 40 is connected across device 17 via an input/output circuit comprising terminal 41. A tuning resistor 42 advantageously is placed across the input/output terminal leads, to provide the optimum mechanically-damped response. The exact range of values for this resistance may be determined through computer simulation using a suitable model of the system dynamics. Alternatively, the resistance value may be selected empirically through measurements of mechanical vibration levels resulting from an induced forcing function applied to the actual mechanical system.

A load capacitor 43 connected from the positive terminal port 4 to port 1 is selected in accordance with one aspect of the invention such that:

$$C_{load}/C_p \leq R_s/R_f \quad (2)$$

The $R_f$, $R_s$ voltage divider sets the negative feedback non-inverting operational amplifier gain. Then, the ratio $R_f/R_s$ is the same as the ratio $C_p/C_{load}$ for identical positive and negative feedbacks.

The feedback arrangement of FIG. 4 advantageously is set to generate slightly less positive feedback through the $C_{load}$–$C_p$ voltage divider than negative feedback through the $R_f$–$R_s$ voltage divider. This is the reason for the inequality condition in Equation (2).

If positive feedback exceeds negative feedback, it implies that the whole circuit has negative equivalent components, and it will be unstable. The voltage-controlled voltage-source negative capacitance configuration described therefore is stabilized additionally by providing compensation of the frequency response of operational amplifier 40. This may be achieved, for example, by components $R_1$, $R_2$ and $C_c$ shown in FIG. 4. The component values are selected for best amplifier stabilization as described in the above-noted APEX publication for the P85 device used herein.

In other words, in addition to the inequality in Equation (2), which is a total systems stability requirement, the operational amplifier 40 should have sufficient gain and phase margin in circuit 35 to prevent oscillations in the overall system, consisting as already noted in connection with FIG. 3 of interacting mechanical, piezoelectric and negative capacitance elements. The compensation required for the amplifier is determined by the gain-phase margin that is practically achievable, the type of amplifier used, and the nature of the piezoelectric and mechanical system involved.

Analysis of the described negative capacitance circuit of the present illustration when used in a boring bar application, indicates that as much as 20 dB reduction in mechanical resonant response can be obtained compared to a boring bar without vibration damping. Further, at least a 6 dB improvement over typical passive shunt circuits is obtained.

In summary, a wideband damping performance in a piezoelectric vibration damper is achieved in accordance with the invention by effectively and reliably removing the capacitive property of the piezoelectric material in the actuator stack, leaving the material's high resistance as the dissipative element for the voltage generated in the device. The electrical energy thus dissipated increases the mechanical damping ratio by from 0.01% to 0.3%, where 1.0% is defined as the critical damping value for a resonant system.

What is claimed is:

1. A vibration-reducing device for damping broadband vibrations of a structure, comprising:

an actuator connected to said structure and comprising piezoelectric material, said material having a broadband capacitive reactance;

a negative capacitance circuit connected in shunt relation to said material, wherein said circuit continuously simulates a negative capacitance of equivalent magnitude but opposite in phase to said capacitive reactance of said piezoelectric material said circuit comprising:

an amplifier having positive and negative feedback loops;

an input/output circuit connecting said amplifier in shunt across said piezoelectric material;

a tuning resistor coupled across said input/output circuit for tuning said negative capacitance circuit;

a resistive voltage divider having a first series connected resistor and a second series connected resistor for determining the negative feedback non-inverting gain of said amplifier said second series connected resistor coupled across said amplifier;

a load capacitor coupled across said amplifier forming a capacitive voltage divider with said capacitive reactance of said piezoelectric material;

wherein the total impedance of the combined negative capactiance circuit and said piezoelectric material is substantially larger than that of said piezoelectric material alone.

2. Apparatus in accordance with claim 1, wherein the total electrical impedance of said piezoelectric material in parallel with said shunt circuit and the driving-point impedance of said shunt circuit are related such that said shunt circuit continuously simulates a predetermined negative capacitance which makes said total electrical impedance effectively an open circuit at any operating frequency.

3. Apparatus in accordance with claim 2, wherein said simulating means comprises a voltage-controlled voltage-source.

4. A vibration-reducing device for damping broadband vibrations in a structure, comprising:

an actuator connected to said structure and comprising a piezoelectric stack having a broadband capacitive reactance $C_p$;

negative capacitance circuit means connected in shunt relation to said stack for continuously simulating a capacitive reactance of a magnitude substantially equivalent to $C_p$ but opposite in phase, said means comprising:

an operational amplifier having positive and negative feedback loops;

an input/output circuit connecting said amplifier in shunt relation across said stack;

a tuning resistor disposed across said input/output circuit for tuning said negative capacitance circuit means to a predetermined optimum mechanically-damped response for the particular said structure;

a resistive voltage divider comprising first and second series-connected resistors, said second resistor being connected across said amplifier, said resistive divider determining the negative feedback non-inverting gain of said amplifier; and a load capacitor connected across said amplifier and forming a capacitive voltage divider with said stack capacitance, the ratio of the impedance of said load capacitor to that of said stack capacitance being equal to or slightly greater than the ratio of the resistive values of said first and said second resistors;

whereby said two-named ratios are substantially the same for identical positive and negative feedback performance of said amplifier.

5. Apparatus in accordance with claim 4, wherein said feedback loops generate slightly less positive feedback through said capacitive voltage divider than negative feedback through said resistive voltage divider.

6. Apparatus in accordance with claim 5, further comprising circuit means connected to said amplifier for compensating for frequency response of said amplifier, thereby to stabilize said negative capacitance circuit means.

7. Apparatus in accordance with claim 6, wherein the piezoelectric material of said stack is PZT; and wherein said operational amplifier is a high voltage, medium current operational amplifier.

8. Apparatus in accordance with claims 1, 2, 3, 4, 5, 6, or 7, wherein said structure is a boring bar machine tool having a chambered cutting end; and wherein said actuator is mounted in said chamber.

* * * * *